(12) United States Patent
Bejhed et al.

(10) Patent No.: US 8,316,873 B2
(45) Date of Patent: Nov. 27, 2012

(54) SINGLE USE VALVE

(75) Inventors: Johan Bejhed, Uppsala (SE); Mikael Karlsson, Uppsala (SE)

(73) Assignee: NanoSpace AB, Uppsala (SE)

( * ) Notice: Subject to any disclaimer, the term of this patent is extended or adjusted under 35 U.S.C. 154(b) by 969 days.

(21) Appl. No.: 12/159,630

(22) PCT Filed: Dec. 28, 2006

(86) PCT No.: PCT/EP2006/050632
§ 371 (c)(1),
(2), (4) Date: Jun. 30, 2008

(87) PCT Pub. No.: WO2007/078250
PCT Pub. Date: Jul. 12, 2007

(65) Prior Publication Data
US 2009/0001303 A1    Jan. 1, 2009

(30) Foreign Application Priority Data
Dec. 30, 2005  (SE) ...................... 0502953

(51) Int. Cl.
*F16K 17/14* (2006.01)
*F16K 17/40* (2006.01)
(52) U.S. Cl. ............ 137/74; 251/11; 220/89.4; 137/828
(58) Field of Classification Search ............... 137/74, 137/72, 828–829; 251/11; 220/89.4
See application file for complete search history.

(56) References Cited

U.S. PATENT DOCUMENTS

| | | | |
|---|---|---|---|
| 4,046,157 A * | 9/1977 | Cazalaa et al. ............ | 137/74 |
| 4,949,742 A | 8/1990 | Rando et al. | |
| 5,320,127 A * | 6/1994 | Yanagihara et al. ........ | 137/72 |
| 6,048,734 A * | 4/2000 | Burns et al. ............... | 436/180 |
| 6,102,897 A * | 8/2000 | Lang ........................ | 604/246 |
| 6,644,786 B1 * | 11/2003 | Lebens ..................... | 347/54 |
| 6,669,683 B2 * | 12/2003 | Santini et al. ............. | 604/890.1 |
| 6,956,268 B2 * | 10/2005 | Faris ........................ | 257/415 |

(Continued)

FOREIGN PATENT DOCUMENTS

DE    43 36 283 A1    4/1995
WO    WO 2004113735 A1 * 12/2004

OTHER PUBLICATIONS

L.J. Guerin et al., "Miniature one-shot valve", Proceeding of the IEEE Micro Electro Mechanical Systems (MEMS), 1998, pp. 425-428.

(Continued)

*Primary Examiner* — Craig Schneider
*Assistant Examiner* — David Colon Morales
(74) *Attorney, Agent, or Firm* — Young & Thompson (57) ABSTRACT

A single use valve (10) comprises a plate (12) having an internal filter structure (28). A sealing substance (20) covers an inlet (14) to the filter structure (28). A heater arrangement (16) is arranged at the plate (12) in the vicinity of the sealing substance (20) for converting electrical current into heat and thereby melting or evaporating the sealing substance (20). The heater arrangement (16) conducts at least a part of the current, and preferably the entire current, along a conduction path not including the sealing substance (20). The melting of the sealing substance (20) thereby becomes independent on the existence of a complete electrical connection through the sealing substance (20). The heater arrangement (16) has therefore preferably its main heat emission in an area surrounding the sealing substance (20). The sealing substance (20) can be of any non-porous material.

23 Claims, 9 Drawing Sheets

U.S. PATENT DOCUMENTS

| | | | |
|---|---|---|---|
| 7,159,618 B2 * | 1/2007 | Broyer et al. | 137/828 |
| 7,474,180 B2 * | 1/2009 | Bintoro et al. | 335/78 |
| 2002/0143437 A1 * | 10/2002 | Handique et al. | 700/266 |
| 2003/0106596 A1 | 6/2003 | Yang et al. | |
| 2004/0007275 A1 * | 1/2004 | Liu et al. | 137/828 |
| 2004/0086390 A1 * | 5/2004 | Burns et al. | 417/48 |
| 2004/0112529 A1 * | 6/2004 | Karlsson et al. | 156/306.6 |
| 2008/0173354 A1 * | 7/2008 | Debray | 137/74 |

OTHER PUBLICATIONS

J. Mueller et al., "Towards micropropulsion systems on-a-chip: Initial results of component feasibility studies", IEEE Aerospace Conference Proceedings, 2000, pp. 149-168.

J. Kohler et al., "A hybrid cold gas microthruster system for spacecraft", Sensors and Actuators A97-98, 2002, pp. 587-598.

European Search Report, dated Nov. 5, 2010, in EP 06835976.

* cited by examiner

SINGLE USE VALVE

TECHNICAL FIELD

The present invention relates in general to valves, and in particular to small single use valves, manufacturing thereof and operation thereof.

BACKGROUND

In many different technical fields of today, there is a need for being able to remotely open up a volume with an extremely high degree of confidence. Examples can be found in space technology, in biochemical production or in drug related applications. In many of these applications, the opening of the volume is a one-shot action, i.e. the volume is not intended to be closed any more. In such applications, so called single use valves are typically used. However, the time elapsing before opening the valve may be very long. In space applications storage times of several years are not uncommon, which calls for seals with essentially no leakage at all. Furthermore, many applications also require any such single use valves to be of a small size.

One example of a single use valve intended for biochemistry applications is disclosed in [1]. Here a hole in a glass plate is covered with a PE/PET film, in which a flap is etched. The flap is adhered to the glass plate. By sending a current through a coil provided around the hole, the adhering of the PE/PET flap is reduced, and any overpressure on the inlet side of the plate will force the flap to bend out at the outlet side of the plate and thereby open a free passage. One disadvantage with such an arrangement is that it is difficult to ensure a tight seal from the beginning. Another disadvantage is that debris particles from the film and/or the adhering material may be removed from the valve and follow into the flowing gas stream. Yet another disadvantage is that this arrangement can only be used for sealing relatively low pressure differences.

Such problems are avoided in a valve disclosed in [2], intended for fluid systems in space applications. A channel is etched in a silicon wafer and covered by a glass plate. A thin plug of silicon is left over the channel, in order to provide a safe seal. The plug is doped to enhance its electrical conductance. Metal leads are deposited on the silicon wafer to connect the two ends of the plug. By sending a current through the plug, the silicon is caused to melt and thereby open a passage through the silicon channel. The channel is provided with bends to trap plug debris, preventing it from leaving the valve. A disadvantage with such a solution is that if the plug cracks with a thin crack or the melting of the plug becomes very local, the opening provided in the channel may not be very large, and at least not controllable. However, the current is prohibited to be conducted through the broken plug, and no further opening can be achieved.

It is not technically possible to combine [1] and [2], since the first one is based on that the flap covers the exit hole of the valve, while the latter requires the plug to be positioned at the inlet of the valve, i.e. before the debris traps.

SUMMARY

A problem with prior-art single use valves is that they fail in providing well-controlled opening of a debris-free flow.

A general objective of the present invention is therefore to provide improved single use valves. A further objective of the present invention is to provide a well-controlled opening of a single use valve. Another further objective is to provide single use valves having a well-defined filter function. Yet another further objective is to provide single use valves having an incorporated pressure sensor.

The above objectives are achieved by methods and devices according to the enclosed patent claims. In general words, a single use valve comprises a plate having an internal filter structure. A sealing substance covers an inlet to the filter structure. A heater arrangement is arranged at the plate in the vicinity of the sealing substance for converting electrical current into heat and thereby melting or evaporating the sealing substance. The heater arrangement conducts at least a part of the current, and preferably the entire current, along a conduction path not including the sealing substance. The melting of the sealing substance thereby becomes independent on the existence of a complete electrical connection through the sealing substance. The heater arrangement has therefore preferably its main heat emission in an area surrounding the sealing substance. The sealing substance can be of any non-porous material, such as a metal, an alloy, glass, paraffin, a polymer or even ice. An alloy (e.g. a solder) is presently the preferred embodiment in most applications. The choice of sealing substance depends on e.g. the required application temperature.

In preferred embodiments, the inlet is provided at an opposite side relative to the outlet. The heater arrangement can be provided at either side of the plate and the plate may be provided with an inert cover layer. The plate preferably comprises two wafers provided with filter structures and bonded together. The plate further comprises a disposal cavity. The plate preferably comprises other integrated functionality, e.g. a pressure sensor.

The present invention further presents a method for manufacturing of a single use valve using the heater arrangement.

The present invention further presents a method for operating a single use valve.

One advantage with the present invention is that it provides a single use valve having an integrated filter. The valve thereby becomes easy and reliable to use. The valve also provides possibilities to be combined with further functionalities requested in different fluid system.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
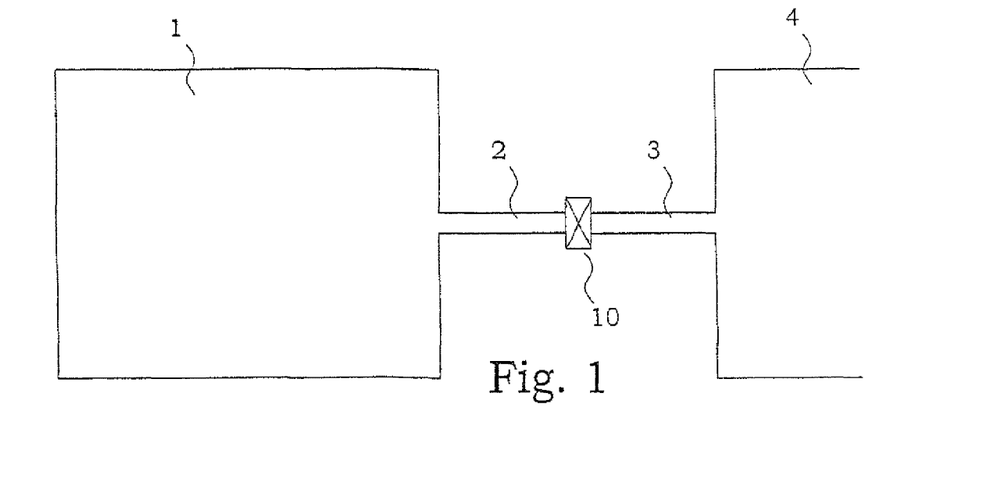
FIG. 1 is a schematic illustration of a typical system in which a device according to the present invention advantageously may be applied.

FIG. 1 illustrates a typical system in which a device according to the present invention advantageously may be applied. A closed chamber 1 comprises fluid under a higher pressure than the surroundings. A tube 2 connects the closed chamber with a single use valve 10. When the single use valve 10 is opened, fluid flows through the tube 2, passes the single use valve and via a second tube 3 reaches a volume 4, where the fluid may be utilized in different ways. The fluid may e.g. participate in chemical reactions in the volume. The fluid may contain drugs which may be distributed in e.g. a mammal body. The mass flow of the fluid may e.g. be used in space applications as driving means.

Figure 2:
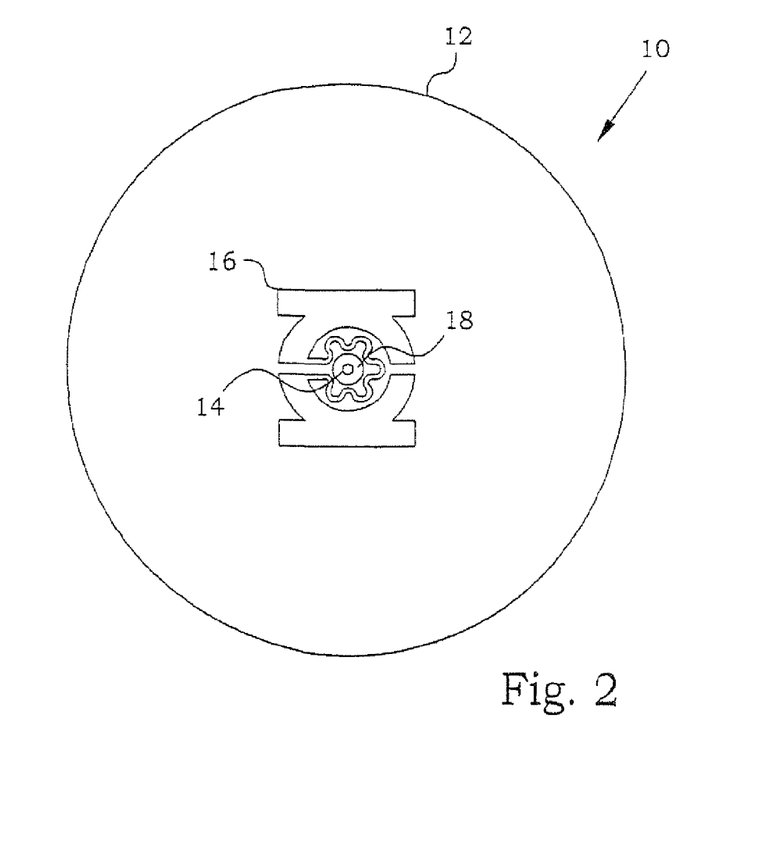
FIG. 2 is a front view of an embodiment of a device according to the present invention, without sealing substance provided.

In FIG. 2, one side of an embodiment of a single use valve 10 according to the present invention is illustrated schematically, before the single use valve 10 is sealed. This particular embodiment is primarily intended for sealing a gas container. A plate 12, in this particular embodiment comprising two silicon wafers bonded together, is provided with an inlet 14. The plate 12 is covered with a thin $SiO_2$ layer, thus being electrically insulating. In alternative embodiments other types of insulating materials can also be used. The inlet 14 connects to a filter arrangement in the interior of the plate 12, which filter arrangement is discussed more in detail further below. The area around the inlet 14 is covered by a wetting layer 18, in this particular embodiment a thin layer of copper and titanium. A heater arrangement 16 is provided in an area surrounding the inlet 14 at the same plate surface as the inlet 14. The heater arrangement 16 is arranged for converting an electrical current into heat. In the present embodiment, the heater arrangement 16 comprises an evaporated copper/titanium pattern. When a voltage is provided over the pattern, a current will flow through the pattern and due to the electrical resistance create heat. The pattern is shaped as a conduction path arranged at said plate around and in a vicinity of the inlet 14. The main heat emission thereby occurs in a vicinity of the inlet 14. In the present embodiment, the pattern is of a meandering shape. However, other designs are also possible, e.g. different kinds of double spirals.

The present invention utilizes small structures and the surface tension of liquid and/or solid material to provide the sealing. The inlet 14 of the single use valve is therefore at the most a few millimeters in diameter and typically smaller than 1 mm. For instance, an inlet 14 size of a manufactured test valve was 420 micrometers.

Figure 3:
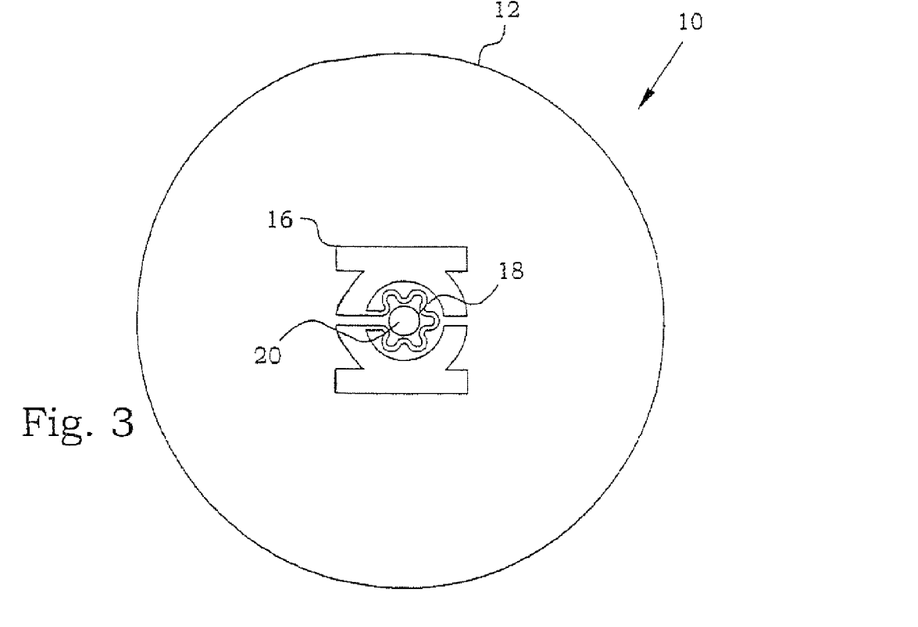
FIG. 3 is a front view of the embodiment of FIG. 2, with sealing substance provided.

In FIG. 3 illustrates the same embodiment as in FIG. 2, when sealed. A sealing substance 20 is there arranged to covering the inlet 14. The sealing substance 20 is before use of the valve in a solid state. In the present embodiment, the wetting layer 18 and the sealing substance 20 are not included in the path for the electric current. In other words, the heater arrangement 16 is arranged for conducting the electrical current in a path excluding the sealing substance 20. However, a heater arrangement 16 including also the wetting layer 18 and/or the sealing substance is possible if the sealing substance 20 is electrically conducting. In such a case, the heater arrangement 16 should be arranged for conducting at least a part of the electrical current in a path excluding the sealing substance 20. This enables the function of the heater arrangement 16 to continue even if the sealing substance 20 is removed.

The heater arrangement 16 is thereby arranged to provide the main heat emission in a vicinity of the sealing substance 20, for being able to cause a phase transition of said sealing substance, from solid to liquid phase or from solid to gas phase. In the present embodiment, the sealing substance is a solder. The wetting layer 18 is thereby necessary to ensure a reliable bond to the wafer plate 12.

Other non-porous materials can also be used as sealing substance 20. The sealing substance 20 is preferably selected depending on the intended application and on the electrical power available for the heater arrangement 16. Non-exclusive examples of possible sealing substances 20 are e.g. other alloys, metals, paraffin, different kinds of thermoplastic polymers and ice. Depending on the selected sealing substance 20, the material of the wetting layer 18 has to be adapted accordingly, or even omitted, if a reliable bond directly to the plate 12 surface can be assured anyway.

Figure 4:
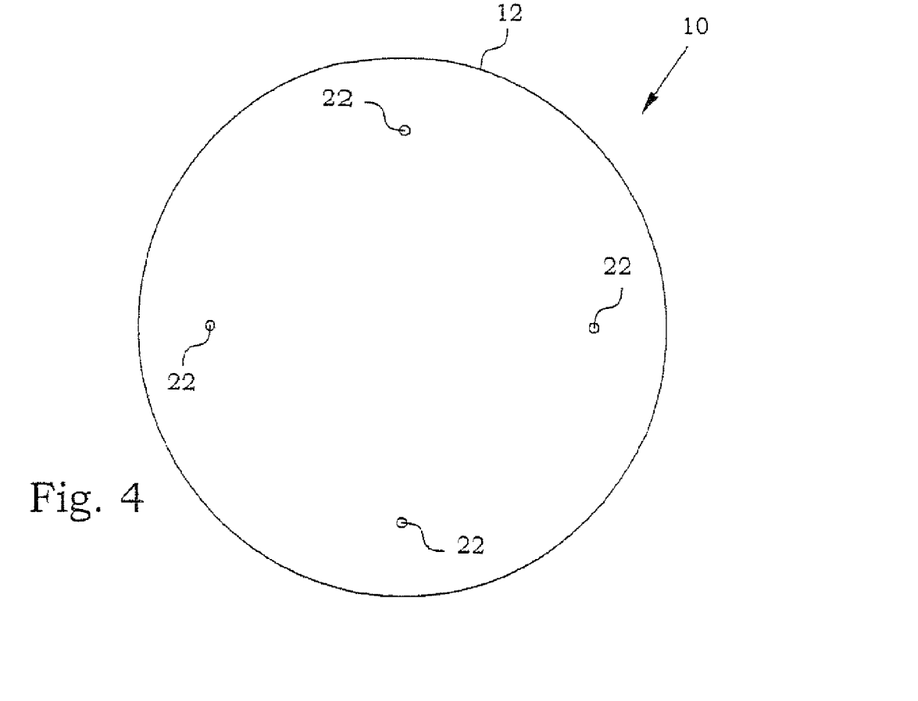
FIG. 4 is a back view the embodiment of FIG. 2.

FIG. 4 illustrates the backside of the embodiment of FIGS. 2 and 3. The plate 12 is there provided by four outlets 22. An internal filter structure, discussed more in detail below, is arranged within the plate 12 between the inlet and the outlets 22.

Figure 5:
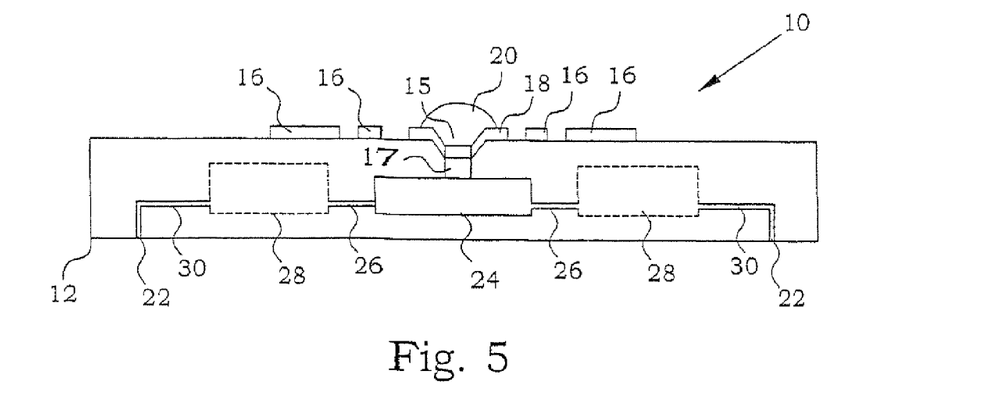
FIG. 5 is a cross-sectional view of the embodiment of FIG. 2.

FIG. 5 illustrates a cross-sectional view of the plate 12 of the embodiment of a single use valve according to the present invention according to FIGS. 2-4. The relative sizes, in particular relations between lateral and thickness dimensions, are not drawn in a true scale. In general, thicknesses are exaggerated to better illustrate the principles of the present invention. The inlet 14 is in this embodiment shaped with an outer cone shape 15 transforming into an inner cylindrical hole 17. The cone shape 15 is at least partially covered with the wetting layer 18. The sealing substance 20 is provided over the inlet 14 to seal it, and penetrates thereby down into the cone shape 15.

Inside the inlet 14, a disposal cavity 24 is provided, which has a volume exceeding the volume of the sealing substance 20. The disposal cavity 24 is connected to a number of input distribution channels 26, which are the inputs of a filter structure 28, which is only schematically illustrated in FIG. 5. Output distribution channels 30 of the filter structure 28 leads to the outlets 22. The outlets 22 and the inlet 14 are provided on opposite sides of the plate 12. It is assumed that in a normal case there is a pressure difference over the single use valve 10, where the higher pressure is present at the inlet side and the lower pressure is present at the outlet side. It would in principle be possible to provide inlets and outlets at the same side of the plate 12, but in such a case, additional sealing structures have to be provided.

Figure 6:
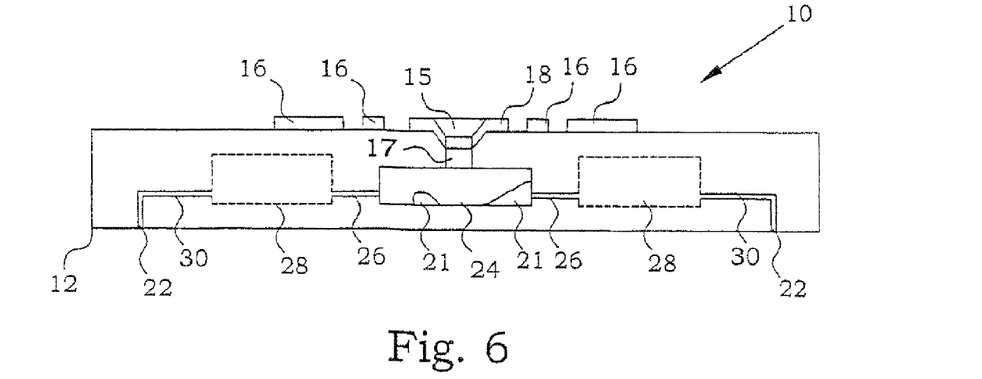
FIG. 6 is a cross-sectional view of the embodiment of FIG. 2, when opened.

When the single use valve 10 is to be opened, a current is connected through the heater arrangement 16, thereby generating heat around the sealing substance 20. The applied power should be adapted to ensure that the generated heat that is conducted to the sealing substance 20 is adequate for causing a phase transition of the sealing substance 20, typically melting it. The pressure difference over the plate 12 will press the melted sealing substance through the inlet 14, down into the disposal cavity 24. Preferably, the disposal cavity is arranged in such a way that at least parts of the walls of the disposal cavity have a temperature below the melting temperature of the sealing substance 20, which then typically will be deposited within the disposal cavity as solid material again. Such a situation is illustrated in FIG. 6, where reference number 21 refers to the redeposited sealing substance. The relatively large volume of the disposal cavity 24 makes it probable that at least one inlet distribution channels 26 will be uncovered by the redeposited sealing substance 21. This will result in that there is opened a free flow path between the inlet side to the outlet side through the filter structure 28. Any material not captured in the disposal cavity will be trapped further inside the filter structure 28, thus providing a particle free flow of fluid, in the present embodiment gas, out from the plate 14 at the outlet side.

Since the current flow through the heater arrangement 16 is not affected, or at least not entirely broken, if parts of the sealing substance 20 are removed from the inlet 14, the heating can continue until an appropriate amount of sealing substance 20 is removed.

Figure 7A:
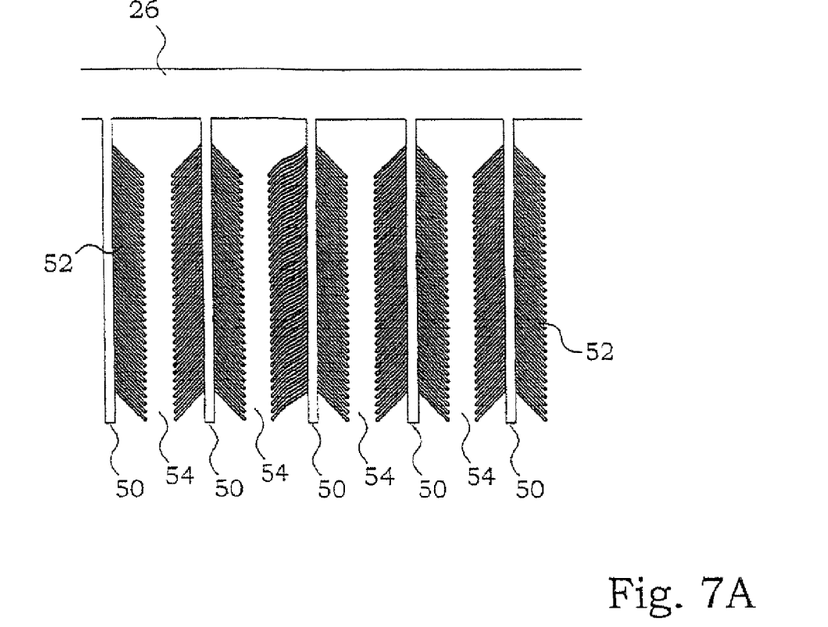
FIGS. 7A-D are schematic illustrations of an embodiment of a filter that advantageously can be used in a device according to the present invention.

The filter structure 28 utilized in the present embodiment is briefly discussed in [3], and is therefore not novel as such. The filter structure 28 is provided by etching two wafers, which eventually are bonded together, giving the internal filter structure. FIGS. 7A to 7D illustrate the properties of the filter structure 28. FIG. 7A illustrates a part of the input side of the filter structure 28. The input distribution channels 26 are branched into a number of narrower input transport channels 50. These channels are typically etched into the surface of a first silicon wafer. The input transport channels 50 are further branched into input filter grooves 52, in this embodiment around 2 micrometers wide and 2 micrometers deep. Also these input filter grooves 52 are etched into the first silicon wafer. One end of the input filter grooves 52 is thus in contact with an input transport channel 50, whereas the other end ends at an input partition ridge 54. The input filter grooves 52 are in this embodiment provided at an angle with respect to the input transport channels 50, preferably around 45 degrees.

Figure 7B:
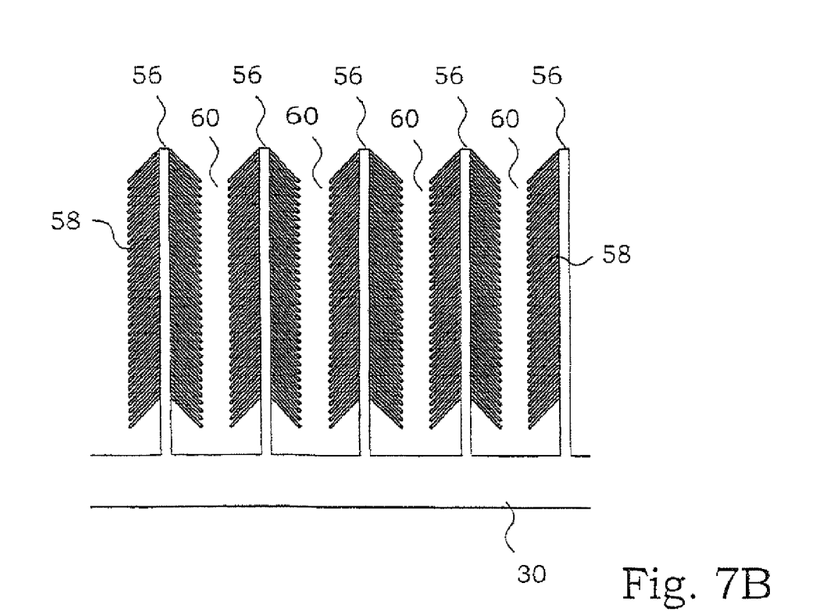

FIG. 7B illustrates a corresponding part of the output side of the filter structure 28. Output distribution channels 30, output transport channels 56 and output filter grooves 58 are provided in a second silicon wafer in a similar way. Between the arrays of output filter grooves 58, output partition ridges 60 are provided.

Figure 7C:
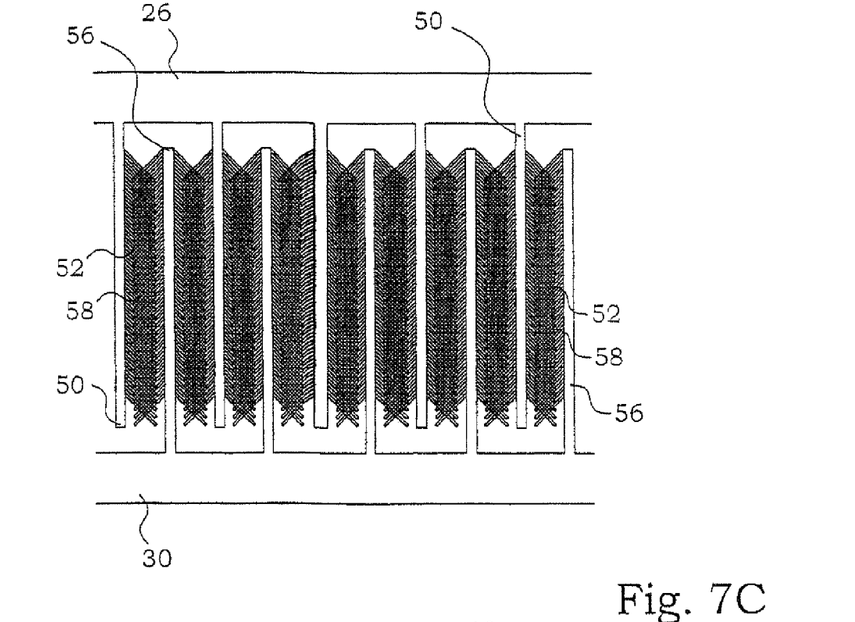

FIG. 7C illustrates a transparent view when the first wafer is positioned against the second wafer with the etched structures facing each other. In manufacturing, the wafers are bonded together, giving a tight seal. The input distribution channels 26 and the output distribution channels 30 are seen to be situated on opposite sides of the transport channels 50, 56. Furthermore, an output transport channel 56 is positioned against an input partition ridge 54 and an input transport channel 50 is positioned against an output partition ridge 60. The areas of filter grooves 52, 58 are overlaid, however, the filter grooves at the input and output sides, respectively, extend in different angles. There are thus a number of connections between one single input filter groove 52 and a number of output filter grooves 58. Likewise, there are a number of connections between one single output filter groove 58 and a number of input filter grooves 52. Gas entering the input distribution channel 26 has to be passed on to an input transport channel 50, since the input distribution channel 26 is closed by the opposite wafer. The gas from the input transport channel 50 has to flow into an input filter groove 52, since the input transport channel 50 is closed by the output partition ridge 60. However, in the input filter groove 52, there are a number of possibilities for the gas to flow over to an output filter groove 58. From this output filter groove 58, the gas will be transported through an output transport channel 56 to the output distribution channel 30, since both these channels also are closed by the opposite wafer.

As a summary, the filter structure 28 comprises in the flow direction channels (input distribution channels 26) branching into smaller channels (input transport channels 50). A transfer from even smaller branches (input filter grooves 52) to corresponding even smaller branches (output filter grooves 58) is allowed, thus forcing any flowing gas to pass many, but tiny openings. Any solid material and liquid material having sufficient surface tension will therefore be trapped somewhere at the input side of the filter. At the output side, smaller channels (output transport channels 56) are merged into larger channels (output distribution channels 30) for gathering the gas flow into one or a few gas streams.

Figure 7D:
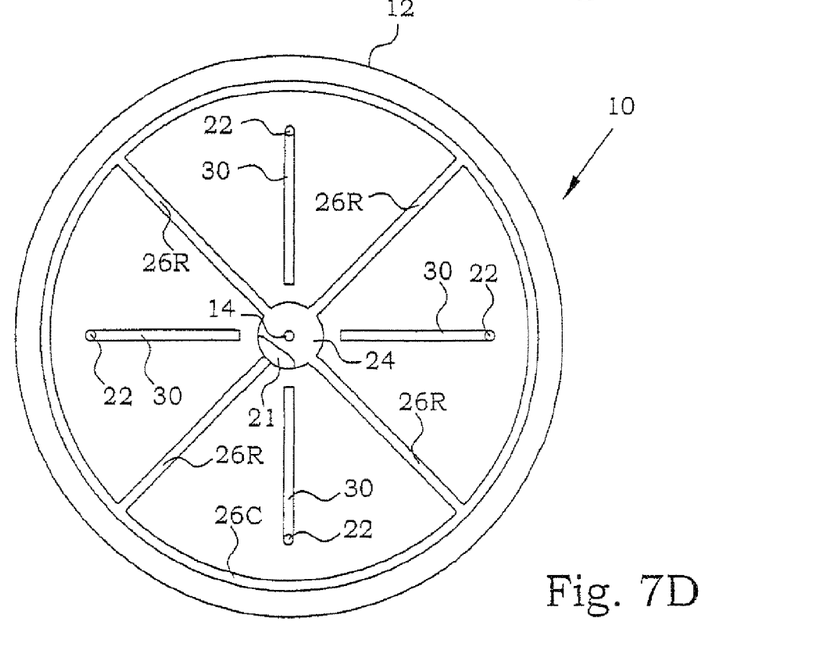

FIG. 7D illustrates a transparent view of the plate 12, where only the distribution channels are shown. In this embodiment, four radial input distribution channels 26R are connected to a central disposal cavity 24. The outer ends of the radial input distribution channels 26R are connected by a circular input distribution channel 26C. At the output side, the output distribution channels 30 are provided in a radial direction ending in an outlet 22 each. Such a configuration provides each input transport channels 50 with at least two separate connections from the disposal cavity 24 and the inlet. This can be useful if the sealing material entering the disposal cavity 24 upon opening of the valve block one or several of the radial input distribution channels 26R. There is then an alternative flow path for the gas to reach each input transport channels 50 and thereby, the entire fine mesh part of the filter structure 28 can still be active.

If the distribution channels, in particular the circular input distribution channel 26C is wide enough, an additional safety feature can be obtained. In cases pressure difference over the valve plate 12 becomes dangerously high, the mechanical force on the relatively thin wall on top of the circular input distribution channel 26C breaks, and gas can be released through the valve device without using the ordinary valve mechanism. The circular input distribution channel 26C thus operates as a designed burst device with weakened fracture indications. The width of the circular input distribution channel 26C as well as the remaining material thickness towards the high-pressure side has to be designed to withstand normal working pressures but not pressures connected to fault situations.

Figure 7E:
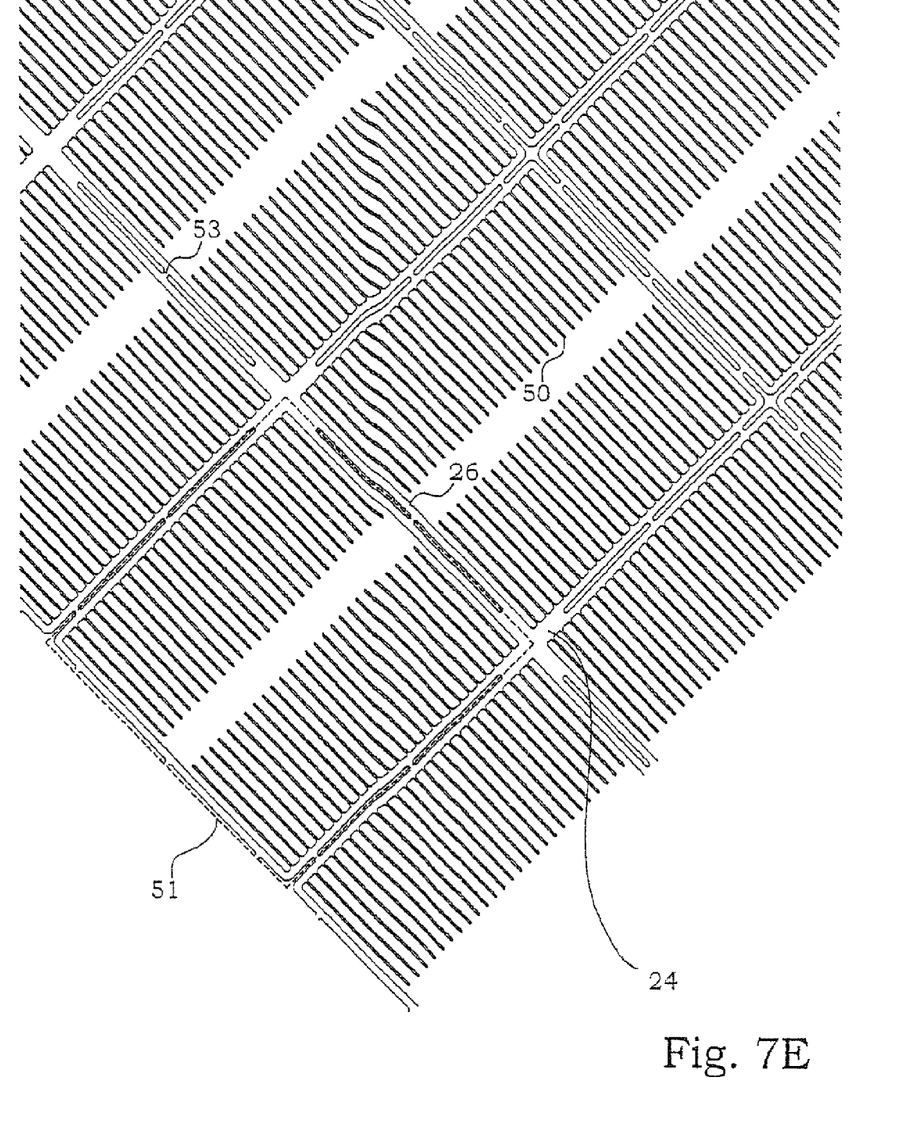
FIG. 7E is a schematic illustration of another embodiment of a filter that advantageously can be used in a device according to the present invention.

In cases no such emergency functionality is desired, the distribution channels 26 should be kept fairly narrow. FIG. 7E illustrates another embodiment of a filter design that also is advantageously used together with the present invention. Here, the circular input distribution channel is removed. The illustration instead shows the distribution channels 26 and input transport channels 50 forming unit cells 51. Each unit cell 51 is associated with a separate outlet. The distribution channels 26 defining the unit cells 51 are in the present embodiment designed as two parallel channels interconnected by bridge segments 53. In such a way, the distribution channels 26 can be designed narrow enough to prohibit any emergency burst function, but still provide satisfactory redundancy in case the distribution channels 26 becomes blocked by sealing substance using the bridge segments 53 to reach other parts of the distribution channel 26.

In the embodiment described above, the heater arrangement is provided at inlet side of the single use valve. In certain applications, the gas provided at the inlet side may be aggressive. However, the inlet side surface of the plate 12 may be affected. In embodiments, where silicon wafers are used, and where the surface is oxidized e.g. in connection with the bonding procedure, a certain protection against e.g. corrosive gases is provided. However, the heater arrangement is typically less resistant, and if the heater arrangement fails, the entire valve is useless.

Figure 8:
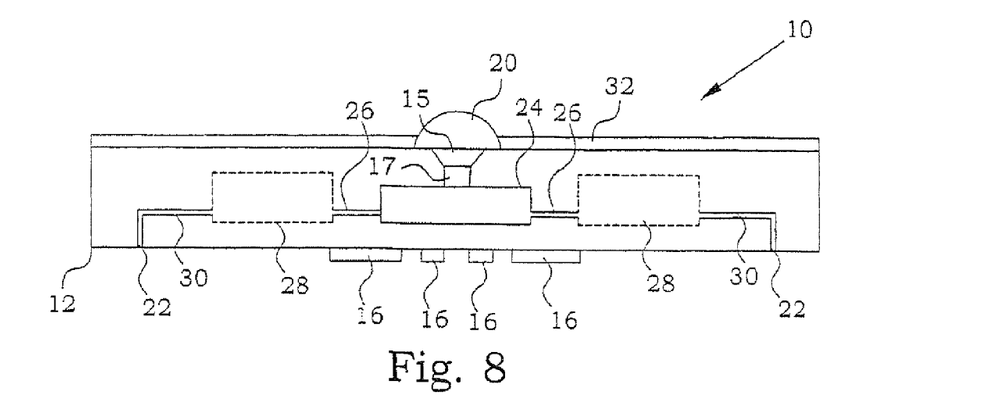
FIG. 8 is a cross sectional view of another embodiment of a device according to the present invention.

FIG. 8 illustrates an embodiment presenting two approaches in protecting the single use valve. In this embodiment, the heater arrangement 16 is provided at the outlet side of the plate 12, i.e. at a plate surface opposite to the inlet 14. At this side, no aggressive gas is expected to reside for any longer times, and in particular not before the valve is opened. If the plate 12 is thin enough and comprises material having a high heat conductivity, the heat power emitted at the heater arrangement 16 may still be enough to cause a phase transition of the sealing substance 20. The heater arrangement 16 is till provided in the vicinity of the sealing substance 20, however, now on the opposite side of the plate 14. Remember that the thickness dimension is drawn in a larger scale than the lateral dimension. Placing the heater arrangement at the outlet side may, however, create additional conditions to consider when designing the shape, size and position of the disposal cavity, since it may be advantageous to have relatively cold walls at this cavity.

In FIG. 8, the plate 14 is also covered with a inert cover layer 32 at the inlet side. This inert cover layer 32 assists in prohibiting corrosion of the plate 14. Typically, the thickness of the sealing substance is large enough to withstand certain chemical attacks, and is therefore in most applications not covered. However, if the sealing substance 20 also is sensitive for corrosion, the inert cover layer 32 may also cover the sealing substance. In such situation, one has to ensure that the inert cover layer 32 also melts or is fragile enough to break when the sealing substance 20 is pressed trough the inlet 14.

When the sealing substance 20 disappears from the inlet 14 into the disposal cavity 24 and provides an appropriate gas flow path through the single use valve 10, there is no use for any continued heating of the plate 14. In prior art valves, this ending of the heating was provided implicitly by breaking the current connection constituted by the seal itself. In the present invention, at least a part of the current does not pass the sealing substance. In most cases, no heating current passes the sealing substance, for instance when electrically insulating materials are used. If electrically conducting sealing substances are used and if a part of the heating current is conducted through the sealing substance, an abrupt change in the electrical resistance of the heater arrangement may inform about a disappearing sealing. A valve use indicator can, if a conducting sealing substance is used, thus be arranged by monitoring the electrical resistance over the sealing structure. However, such control methods have basically some drawbacks common with prior art solutions.

A preferred way to determine if an appropriate flow path is created, i.e. a valve use indicator, is based on pressure measurements or pressure difference monitoring. A valve use indicator comprising a pressure or pressure difference sensor can preferably be provided within the plate or at the outlet side of the plate.

Figure 9:
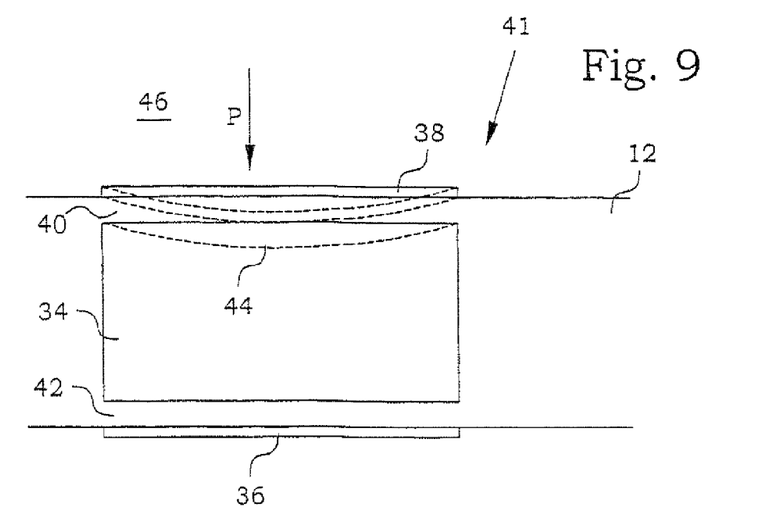
FIG. 9 is a schematic illustration of a pressure monitor.

FIG. 9 illustrates one embodiment of a pressure sensor 41 integrated in the single use valve plate 12. A pressure measuring cavity 34 is provided in the plate 12. The pressure measuring cavity 34 is preferably in pressure communicating contact with the channels through the plate 12 or at least with the outlet. A section of the cavity wall 40 is thin enough for providing resilience. Two electric conductors 36, 38, preferably having a non-negligible extension in two-dimensions, are provided at opposite sides of the pressure measuring cavity 34. The electrical conductors 36, 38 are connected to an electrical circuit for detecting a capacitance change between said two electric conductors (not shown). When a pressure difference between a volume 46 on the inlet side of the plate 12 and the pressure measuring cavity 34 exists, the thin cavity wall 40 will bend, as illustrated by the broken lines 44. Such geometrical configuration will give rise to a certain capacitance between the two electrical conductors 36, 38. When the pressure difference changes, e.g. when the valve opens and gas flows through the pressure measuring cavity 34, the cavity wall 40 will bend back, and the capacitance between the two electrical conductors 36, 38 will change. Such a change in capacitance is indicative of the pressure difference over the thin cavity wall 40, and can be used as an indicator that the valve has opened properly. The current through the heater arrangement can then be turned off.

Figure 10:
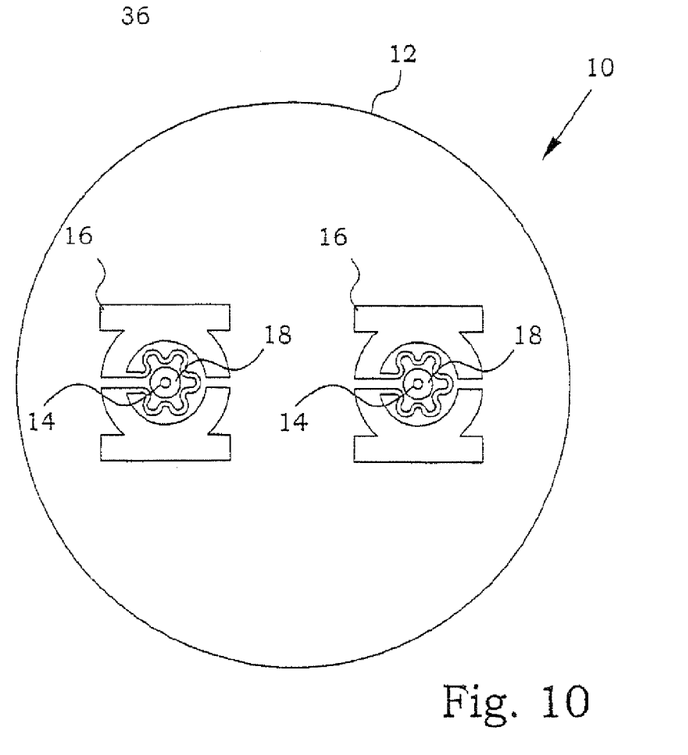
FIG. 10 is a schematic view of a double valve plate.

Single use valves are often applied in situations, where a failure in opening would result in very large economical losses. For instance, if a valve installed in a space vehicle would fail, there are practically no possibilities to repair or replace the valve. A redundancy in valve operation is therefore often requested. The typical manner is to provide two separate valves. In connection with the present invention, it is easy to comprise more than one valve in a single plate 12. FIG. 10 illustrates an embodiment, where a plate 12 comprises two sets of valve equipment. Two separate inlets 14 are provided associated with a respective heater arrangement 16. Different levels of redundancy are feasible. One possibility is that each inlet 14 is connected to a separate internal filter and separate outlets. However, since the operation of the actual internal filter is considered to be very accurate, and any failures are expected to occur when opening the inlet 14, the redundant inlets may also be connected to one and the same internal filter.

Figure 11:
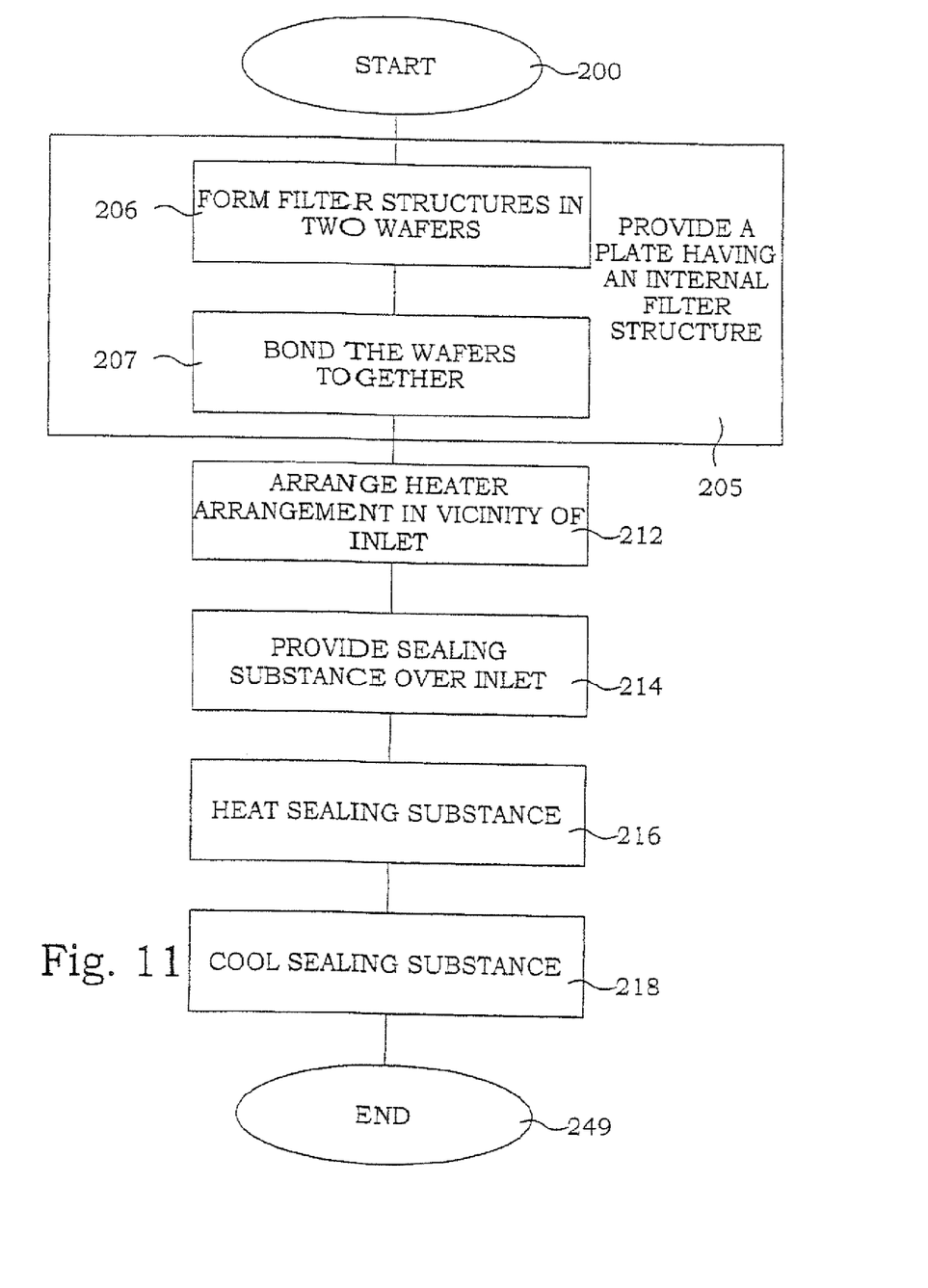
FIG. 11 is a flow diagram of main steps of an embodiment of a manufacturing method according to the present invention.

FIG. 11 is a flow diagram of main steps of an embodiment of a manufacturing method according to the present invention. The procedure starts in step 200. In step 205, a plate is provided. The plate has an internal filter structure between an inlet and an outlet. In step 212, a heater arrangement for converting electrical current into heat is arranged at the plate in a vicinity of the inlet. This step is preferably performed by covering a first surface of the plate with metal conductors, in which electrical current is transformed into heat. However, other techniques may also be utilized, e.g. creating doped paths in a semiconductor plate. For such reasons, step 212 may in certain embodiments occur before or simultaneous of e.g. the internal filter structure provision in step 205. A sealing substance is provided sealing over the inlet in step 214. In step 216, the sealing substance is heated, in order to provide a tight seal against the plate. Since such process is intended to be performed without any pressure difference over the plate, the surface tension is typically enough to prohibit the sealing substance to penetrate to far into the inlet. As mentioned further above, this requires that the dimensions of the inlet 14 are small enough. The heating can advantageously be performed by using the very same heater arrangement that is already provided at the plate. This also ensures that the heater arrangement is operating and provides enough heat for its later opening purposes. To this end, an electrical current is sent through the heater arrangement, whereby according to the above described properties at least a part of the electrical current is conducted in a path excluding the sealing substance. However, during the manufacturing the heating of the sealing structure may also be performed by other more traditional means, e.g. by placing the plate in a furnace, irradiating the sealing substance with electromagnetic waves etc. The sealing substance is allowed in step 218 to cool down again, obtaining the solid state that ensures the sealing of the inlet. The procedure ends in step 249.

In a preferred embodiment, micro electric mechanical systems (MEMS) techniques are utilized, in particular in the steps 205, 212 and/or 214, and most particularly step 205. Even if the actual single use valve typically is a miniature device, the procedures to achieve the active structures of the device are suitable to be implemented by MEMS.

The step of providing a plate 205 can preferably comprise the following part steps. In step 206, filter structures are formed in two silicon wafers. In step 207, the two silicon wafers are bonded together, giving rise to an internal filter structure.

The manufacturing may as indicated above also comprise an additional step of covering a side of said plate, where said inlet is provided, by an inert cover layer.

Figure 12:
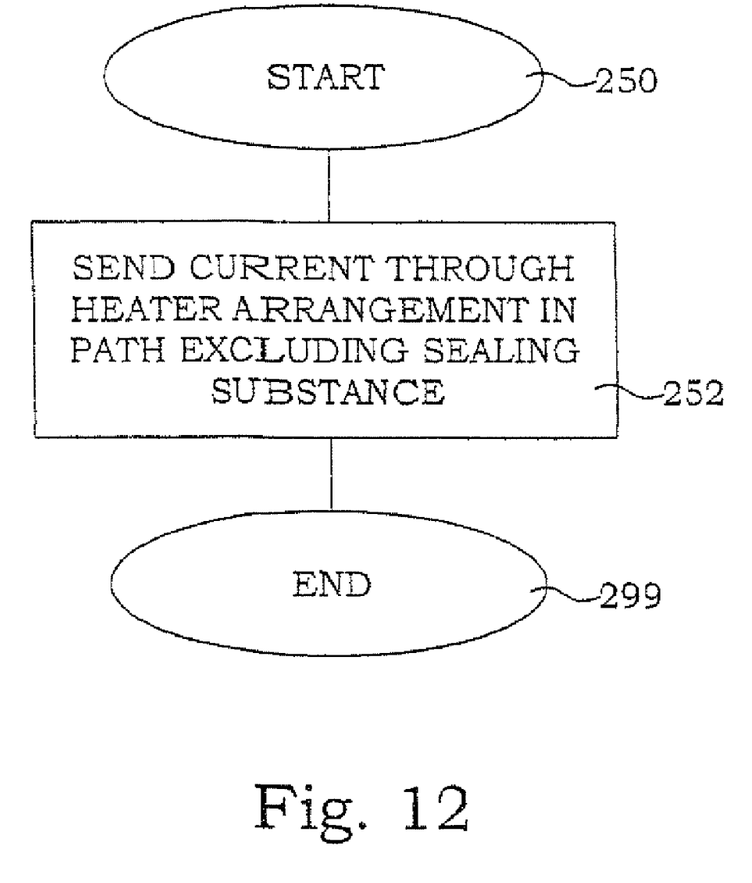
FIG. 12 is a flow diagram of main steps of an embodiment of an operating method according to the present invention.

FIG. 12 is a flow diagram of main steps of an embodiment of a method of opening a single use valve having a plate with an internal filter structure between an inlet and an outlet and a sealing substance in a solid phase covering the inlet, according to the present invention. The procedure starts in step 250. In step 252, a current is conducted through a heater arrangement arranged for converting an electrical current into heat, arranged at the plate in a vicinity of the sealing substance, for causing a phase transition of said sealing substance. At least a part of the electrical current is thereby conducted in a path excluding the sealing substance. Preferably, all current is conducted in a path excluding the sealing substance. The melting of the sealing substance thereby becomes independent on the existence of a complete electrical connection through the sealing substance. The procedure ends in step 299.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] L. J. Guérin et al, "Miniature one-shot valve", Proceeding of the IEEE Micro Electro Mechanical Systems (MEMS) 1998, IEEE, Piscataway, N.J., USA, 98CH36176, pp. 425-428.
[2] J. Mueller et al, "Towards micropropulsion systems on-a-chip: Initial results of component feasibility studies", IEEE Aerospace Conference Proceedings, v 4, 2000, pp. 149-168.
[3] J. Köhler et al, "A hybrid cold gas microthruster system for spacecraft", Sensors and Actuators A97-98 (2002), pp 587-598.

The invention claimed is:

1. A single use valve, comprising:
a plate, having an internal filter structure between an inlet at an outer surface of said plate and an outlet, said outer surface being an upstream surface with respect to said inlet and being provided at a high pressure side of said plate;
a sealing substance in a solid phase, covering said inlet at said outer surface and prohibiting gas from said high pressure side of said plate from entering said inlet; and
heater arrangement arranged for converting an electrical current into heat, arranged at said plate in a vicinity of said sealing substance, for causing a phase transition of said sealing substance;
said heater arrangement being arranged for conducting at least a part of said electrical current in a path excluding said sealing substance.

2. A single use valve according to claim 1, wherein said heater arrangement being arranged for conducting all said electrical current in a path excluding said sealing substance.

3. A single use valve according to claim 1, wherein said heater arrangement has its main heat emission in an area surrounding said sealing substance.

4. A single use valve according to claim 1, wherein said phase transition is a transition from solid to liquid phase.

5. A single use valve according to claim 1, further comprising a wetting layer between said plate and said sealing substance.

6. A single use valve according to claim 1, wherein said outlet is provided in a second surface of said plate, opposite to said outer surface of said plate.

7. A single use valve according to claim 1, wherein said heater arrangement is provided at a same plate surface as said inlet.

8. A single use valve according to claim 1, wherein said heater arrangement is provided at a plate surface opposite to said inlet.

9. A single use valve according to claim 1, further comprising an inert cover layer covering a plate surface at which said inlet is provided.

10. A single use valve according to claim 1, wherein said plate comprises at least two wafers provided with filter grooves bonded together.

11. A single use valve according to claim 1, wherein said plate further comprises a disposal cavity between said inlet and said filter structure.

12. A single use valve according to claim 1, wherein said sealing substance comprises any non-porous material selected from the list of:
metal;
solder;
alloy;
glass;
paraffin;
polymer; and
ice.

13. A single use valve according to claim 12, wherein said sealing substance is a solder.

14. A single use valve according to claim 1, wherein said filter structure comprises channels branching into smaller channels.

15. A single use valve according to claim 14, wherein said smaller channels having at least two separated connections from said inlet.

16. A single use valve according to claim 1, further comprising a valve use indicator, indicating whether said single use valve has been opened or not.

17. A single use valve according to claim 16, wherein said valve use indicator is a pressure sensor.

18. A redundancy single use valve, having at least two single use valves provided at the same plate, each of said at least two single use valves comprising:
a plate, having an internal filter structure between an inlet at an outer surface of said plate and an outlet, said outer surface being an upstream surface with respect to said inlet and being provided at a high pressure side of said plate;
a sealing substance in a solid phase, covering said inlet at said outer surface and prohibiting gas from said high pressure side of said plate from entering said inlet; and heater arrangement arranged for converting an electrical current into heat, arranged at said plate in a vicinity of said sealing substance, for causing a phase transition of said sealing substance;

said heater arrangement being arranged for conducting at least a part of said electrical current in a path excluding said sealing substance.

19. Method of manufacturing of a single use valve, comprising the steps of:

providing a plate with an internal filter structure between an inlet at an outer surface of said plate and an outlet, said outer surface being an upstream surface with respect to said inlet and being provided at a high pressure side of said plate;

arranging a heater arrangement for converting electrical current into heat at said plate in a vicinity of said inlet;

providing sealing substance over said inlet at said outer surface;

heating said sealing substance to melt completely; and cooling said sealing substance to obtain a solid phase, said solid phase prohibiting gas from said high pressure side of said plate from entering said inlet.

20. Method according to claim 19, wherein said step of heating said sealing substance to melt comprises the step of sending an electrical current through said heater arrangement, whereby at least a part of said electrical current is conducted in a path excluding said sealing substance.

21. Method according to claim 19, wherein at least one of said step of providing a plate, said step of arranging heater arrangement, and said step of providing sealing substance over said inlet is performed by micro electro mechanical systems, MEMS, techniques.

22. Method according to claim 19, wherein said step of providing a plate with an internal filter structure in turn comprises the steps of:

forming filter structures in two wafers; and bonding of said two wafers.

23. Method of opening a single use valve having a plate with an internal filter structure between an inlet at an outer surface of said plate and an outlet, said outer surface being an upstream surface with respect to said inlet and being provided at a high pressure side of said plate, and a sealing substance in a solid phase covering said inlet at the outer surface and prohibiting gas from said high pressure side of said plate from entering said inlet, the method comprising the step of:

sending a current through a heater arrangement arranged for converting an electrical current into heat, arranged at said plate in a vicinity of said sealing substance at said outer surface, for causing a phase transition of said sealing substance;

wherein at least a part of said electrical current is conducted in a path excluding said sealing substance, and wherein at least part of said sealing substance undergoes the phase transition and gas from said high pressure side of said plate enters said inlet.

* * * * *